United States Patent [19]
Loomis, Sr. et al.

[11] Patent Number: 6,019,194
[45] Date of Patent: Feb. 1, 2000

[54] QUICK SET-UP, AUTOMATICALLY-ADJUSTING, SCAFFOLD SEAT

[75] Inventors: Darren Arthur Loomis, Sr.; William Nicholas Makris, both of Putney, Vt.; Arnie Rosenbach, Amherst, Mass.

[73] Assignee: Timely Solutions, Inc., Putney, Vt.

[21] Appl. No.: 09/128,002

[22] Filed: Aug. 3, 1998

[51] Int. Cl.[7] .................................................. A01M 31/00
[52] U.S. Cl. ............................................................. 182/187
[58] Field of Search ........................................ 182/187, 92

[56] References Cited

U.S. PATENT DOCUMENTS

| | | | |
|---|---|---|---|
| 287,059 | 8/1883 | Klins | 182/187 |
| 2,549,679 | 4/1951 | Foote . | |
| 3,664,460 | 5/1972 | Zdroik . | |
| 4,394,045 | 7/1983 | Shaw et al. . | |
| 4,397,500 | 8/1983 | Moffit . | |
| 4,600,081 | 7/1986 | Wade . | |
| 4,600,082 | 7/1986 | Rauls . | |
| 4,605,094 | 8/1986 | Minerd . | |

*Primary Examiner*—Alvin Chin-Shue

[57] ABSTRACT

A comfortable, quiet, and safe, lightweight seat which is designed for hunters, birdwatchers, hikers, and tourists to be used with any upright object such as a tree, column, or pole. The soft, flexible, sling-type seat is set up in one motion by means of a spring-braced clip and requires no adjustments since the seat automatically levels itself and automatically tightens its support around the upright object by means of a readily sliding suspending cord, and is easily tilted to any position by the user due to its balanced fulcrums. When not in use it can be neatly rolled up and placed in pocket, knapsack, or handbag.

1 Claim, 4 Drawing Sheets

QUICK SET-UP, AUTOMATICALLY-ADJUSTING, SCAFFOLD SEAT

BACKGROUND-FIELD OF THE INVENTION

This invention pertains, to a scaffold mounted on a shaft. More particularly, this invention relates to a seating implement which utilizes a singular upright object such as a tree, pole, column, or the like.

BACKGROUND-DESCRIPTION OF PRIOR ART

A number of seats have been designed to be used in conjunction with upright objects. However, some of these seats such as in Zdroik, U.S. Pat. No. 3,664,460 (1972), Wade, U.S. Pat. No. 4,600,081 (1986), Rauls, U.S. Pat. No. 4,600,082 (1986), and Minerd, U.S. Pat. No. 4,605,094 (1986) use heavy, bulky, and rigid materials which not only make it difficult for the hunter, the birdwatcher, the infirm, or the youngster to carry easily for extended periods, but also create noise while being carried or while being set up and thus scare away game, birds, and other wildlife.

While the sling-type seats in Foote, U.S. Pat. No. 2,549,679 (1951), Shaw et al., U.S. Pat. No. 4,394,045 (1983), and Moffit, U.S. Pat. No. 4,397,500 (1983) do away with the problems inherent in the aforementioned heavy, bulky, and noisy materials, they present other problems solved by the present invention. Specifically, the Foote invention requires that the user tie two sets of straps around the girth of the object, thus using up valuable time and creating difficulty in both the tying procedure and in the final re-adjustment and re-tying that is necessary to get the proper tension for the straps and the optimum height and comfort level for the user. In the Shaw invention, the user must thread the end of the girth belt through a buckle and then adjust the seat level by manipulating the webbing straps. This presents the user with a time of set up and ease of use problem. Also, the design of the seat itself presents a comfort problem. The webbing straps stitched on the upper and lower bases of the seat support the full weight of the user and tend to dig into the user's upper thighs and lower back and no means are available to adjust the relative length of these webbing straps. Thus, the user can not be expected to sit in this seat for the extended period of time that is often necessary in waiting for game, birds, and wildlife to approach or for other activities such as eating meals and resting. In the Moffit invention, some comfort is sacrificed due to the plastic pipe or sleeve that is needed to adjust the backward and forward tilt of the seat. This pipe or sleeve., due to its diameter, has the tendency to pinch the user's hips, especially with prolonged use. Of more concern, the methods for adjusting the strap around the girth of the tree, for adjusting the length of the two ropes which support the seat and ensure that it may be level, and for adjusting the tilt of the seat toward or away from the upright supporting object are time consuming, have the tendency to fray the ropes, and present the user with an unnecessary level of difficulty and complexity.

BRIEF SUMMARY OF THE INVENTION

The present invention provides a very comfortable, lightweight, sling-type seat which can be kept in a pocket when not in use, which can be noiselessly, quickly and easily set up with no assembly, which automatically adjusts itself to the girth of any upright object, which automatically levels itself, and which is balanced to tilt to the angle desired by the user. It was developed by field trials over a 12 year span. It is also easy to manufacture, is rugged and durable, and is safe to use since there is no danger of failing due to any chafing and fraying of the components. Thus, it represents an improvement over all previously known designs.

A suitable length of webbing which on one side has a commercially available metal or synthetic ring, shaped in a form similar to the letter "D" called a "D-ring", attached and through which a suspending cord for the seat slides readily and easily, and which on the other side has a quick-release, spring-braced clip is provided. Also provided is a seat made from soft, durable material such as canvas, which is supported on each end with thin, solid lightweight rods. To the midpoint along the length of each rod the suspending cord is attached, thereby comfortably distributing the load of the user equally over the entire seat and thereby balancing the seat so that it may be automatically tilted howsoever the user desires.

To set up the present invention, the user simply opens the spring-braced clip, holds the opened clip in one hand and the suspending cord in the other, reaches around the upright object and releases the spring-braced clip around the suspending cord. The user now sits down in the sling seat which automatically supports its own weight and which is automatically level since the cord readily slides within both the D-ring and the spring-braced clip. Since the suspending cord slides through the ends of the webbing, the user's weight automatically tightens the webbing sufficiently around the upright object. Moreover, since the supporting cord is attached to the midpoints along the length of the rods, which are supporting the weight of the seat and the user, two balanced fulcrum points are formed which allow the user to easily tilt the seat to any angle desired. When the seat is not in use, the components are placed on top of the seating material which is rolled up neatly and compactly. Lastly, the seat is safe to use and does not present the danger of failure due to chafing and fraying of the components in unnecessary adjusting components. All of these properties are important, especially to people who will be using this seat when hunting, hiking, birdwatching, or otherwise employed in the forest, or using it on other upright objects such as telephone poles.

Hence, it is an object of the invention to provide a sling-type seat that can be hung from virtually any upright object with only one easy movement and which automatically adjusts itself to the girth of the upright object, automatically levels itself, and is balanced to tilt to the angle desired by the user, so that no time and effort is wasted on unnecessary adjustments and movements which may scare away birds and other wildlife and which even the young or elderly will use with ease.

Another object of the invention is to provide a sling-type seat which may be sat in for even hours at a time without causing the user the slightest discomfort.

Yet another object of the invention is a seat which has no danger of failure due to the chafing or fraying of any of its components since all parts are smooth and are designed to slide with virtually no friction.

Still another object of the invention is to provide a seat which is very light to carry and able to be easily rolled up and kept in a pocket, backpack, or knapsack when not in use.

Other objects, advantages, and novel features of the invention will be apparent from the detailed description when considered in conjunction with the accompanying drawings.

Figure 1:
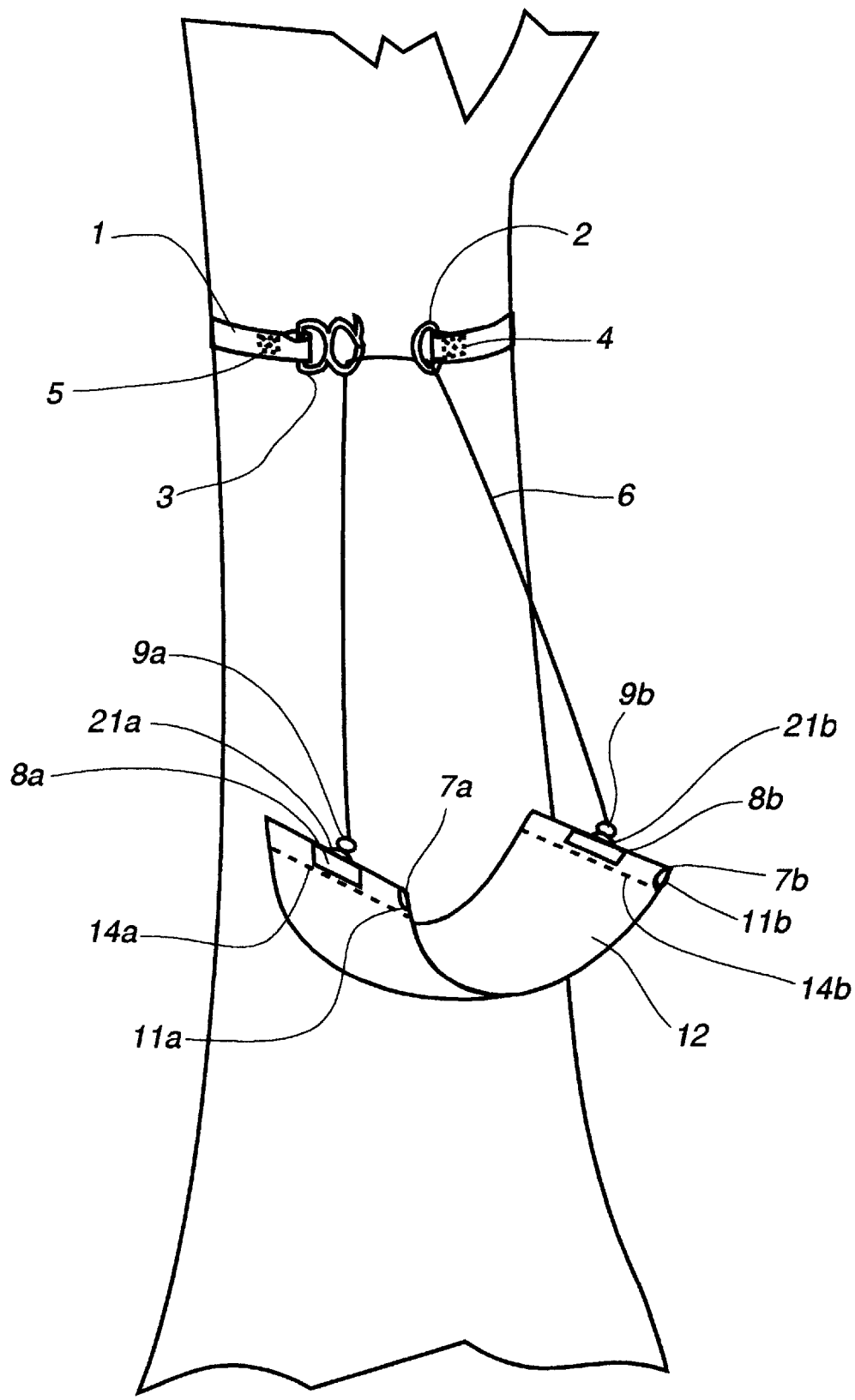
FIG. 1. is a perspective view of the invention hanging from a tree trunk before the user has sat down on it.

| Reference Numerals In Drawings | | | |
|---|---|---|---|
| 1 | girth webbing | 14a | first side pocket stitch |
| 2 | D-ring | 14b | second side pocket stitch |
| 3 | spring-braced clip | 15a | first side seat end |
| 4 | first end box and cross stitch | 15b | second side seat end |
| 5 | second end box and cross stitch | 16a | front side seat hem |
| 6 | suspending cord | 16b | back side seat hem |
| 7a | front side support rod | 17a | front side seat |
| 7b | second side support rod | 17b | back side seat |
| 8a | first side pre-slit leather grommet | 18a | f. sd. lthr. grom. stitch |
| 8b | second side pre-slit leather grommet | 18b | s. sd. lthr. grom. stitch |
| 9a | first side cord knot | 19a | first side cord end |
| 9b | second side cord knot | 19b | second side cord end |
| 10 | securing material | 20 | slit |
| 11a | first side seat pocket | 21a | first V-shaped bend |
| 11b | second side seat pocket | 21b | second V-shaped bend |
| 12 | seat | 22 | second side assembly |

DETAILED DESCRIPTION-FIG. 2

Figure 2:
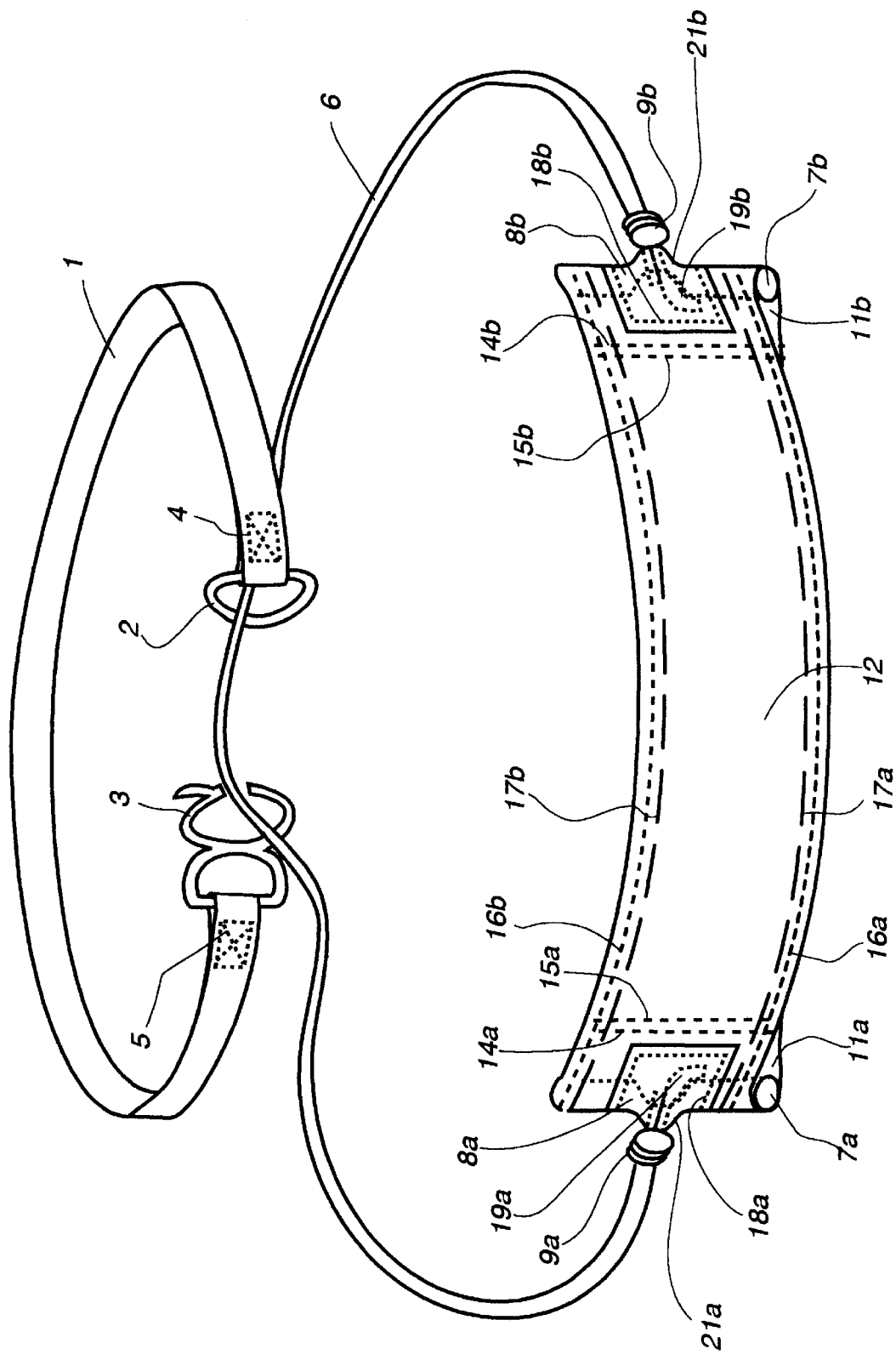
FIG. 2. is a pictorial showings parts of the invention assembled.

Referring to FIG. 2, the preferred embodiment of the invention is constructed as follows. Seat 12 is made from a rectangular piece of flexible, soft, and durable material such as canvas, nylon, vinyl, or the like. To increase the strength of seat 12 and to decrease the possibility of fraying, front side seat end 17a is folded over and stitched with front side hem stitch 16a. Similarly back side seat end 17b is folded over and stitched with back side hem stitch 16b. Pre-slit first side leather grommet 8a is centered on material and sewn on with first side leather grommet stitch 18a while pre-slit second side leather grommet 8b is sewn on with second side leather grommet stitch 18b. The seat material directly under the slits of first side leather grommet 8a and second side leather grommet 8b is now slit. Not only do first side leather grommet 8a and second side leather grommet 8b keep the seat material from visibly fraying, but as will be seen later in this description, they add strength to the crucial fulcrum points of seat 12 and they also hold first side cord knot 9a and second side cord knot 9b nicely and neatly in place. This was a significant improvement over earlier designs of the invention, in which a slit in the seat material with buttonhole stitching was used or brass grommets of differing diameters.

First side seat end 15a is now folded over approximately 1½ inches and stitched with first side pocket stitch 14a thus forming first side seat pocket 11a. Second side seat end 15b is also folded over and stitched with second side pocket stitch 14b thus forming second side seat pocket 11b, which measures approximately 1½ inches in width. When laid down flat the finished seat dimensions should be a rectangle approximately 9 inches as measured from front to back and 21 inches as measured from first side to second side.

Girth webbing 1 is made from webbing material such as cotton, nylon, or polypropylene, or from any suitable strap or rope. It has on the first end a metal or synthetic plastic D-ring 2 stitched on with first end box and cross stitch 4 or some other strong means of attachment and on the second end a spring-braced clip 3 preferably with round cross section and very smooth finish attached with second end box and cross stitch 5 or some other strong means of attachment.

Note that any means of attachment that is closed and smooth could be substituted for D-ring 2 and any means of connection for connecting and disconnecting that is readily openable and closeable and smooth could be substituted for spring-braced clip 3. Note further that in an alternate arrangement (not shown) another closed and smooth means of attachment such as a D-ring may be substituted for spring-braced clip 3 on the second end of girth webbing 1 and an openable and closeable, smooth means of connection can be slid over suspending cord 6.

The width of girth webbing 1 is preferably 1" since it is the most readily available, but any sufficiently strong webbing, strap, or rope could be substituted. The preferred length measured from end of D-ring 2 along girth webbing 1 to end of spring-braced clip 3 has been determined to be approximately 28 inches. This length is suitable for upright objects from approximately 9 inches in diameter to approximately 21 inches in diameter. Upright objects less than 9 inches in diameter do not make a comfortable seat back rest when used, and upright objects greater than 21 inches in diameter are too big for most people to get their arms around in order to set up the invention in one motion. It should be pointed out that a metal or synthetic slide (net shown) could be incorporated into girth webbing 1 to increase the range of upright object diameters that can be used for the invention, but practice has shown this to be unnecessary for the reasons stated above.

First cord end 19a of suspending cord 6 is now passed through D-ring 2. A nylon-braided double-sized parachute cord, which is about 5/32" in diameter and contains a core, is preferred for suspending cord 6. It was found that this size and material cord offers the best strength, durability, and sliding characteristics for achieving the objects of the invention. Note other size and material cord could be used as well.

DETAILED DESCRIPTION-FIGS. 3 AND 4

Figure 3:
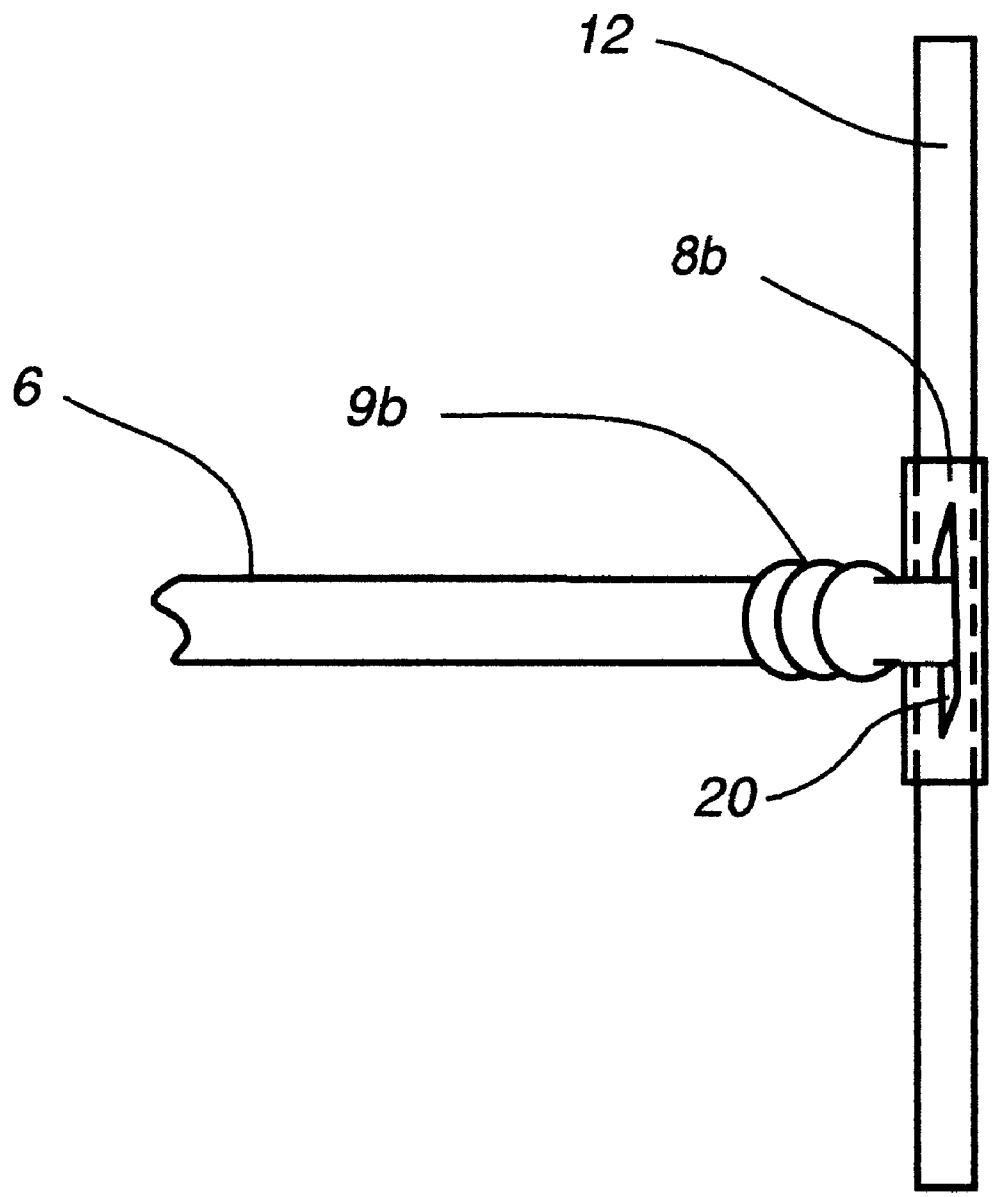
FIG. 3 is an end view of the seat.
Figure 4:
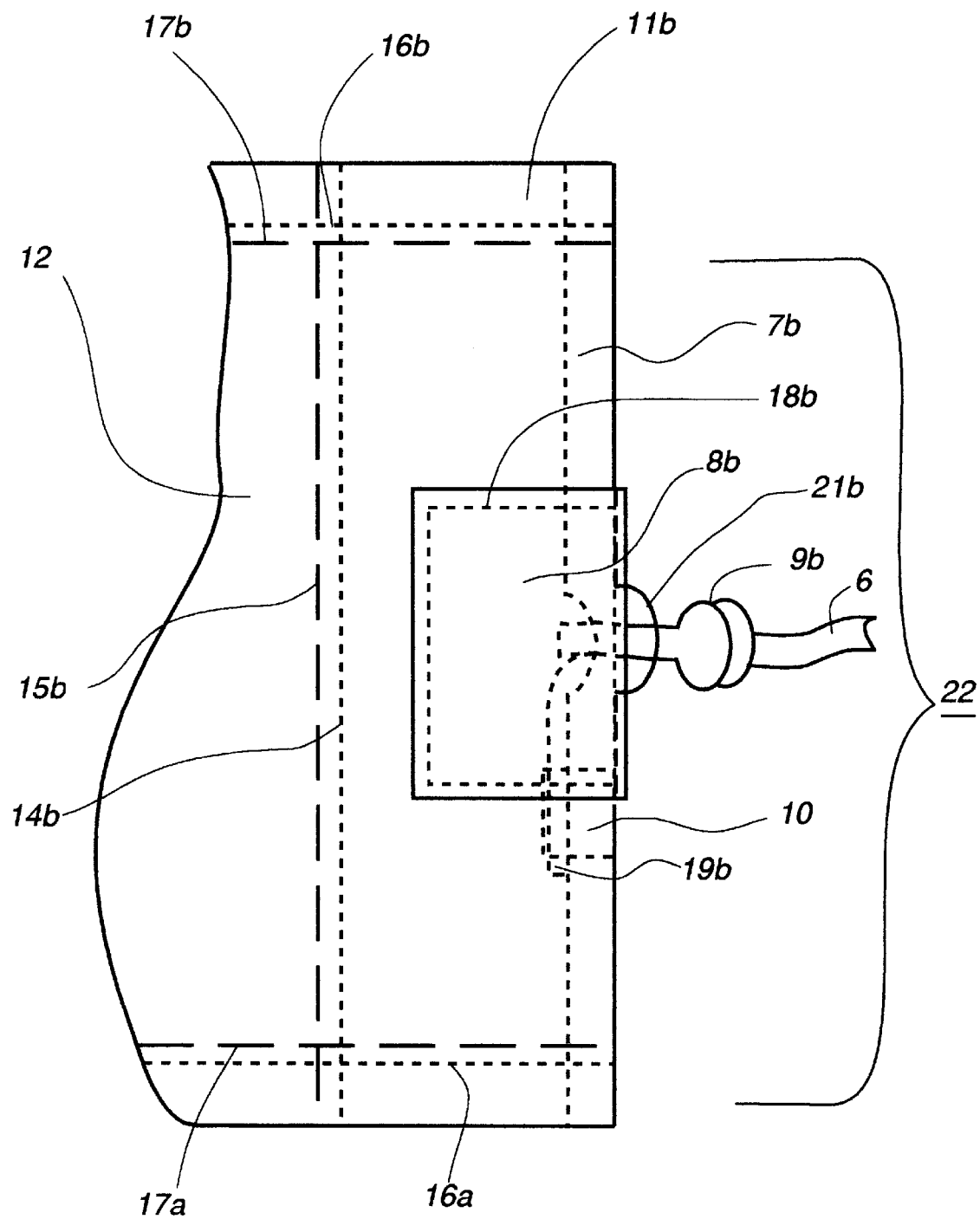
FIG. 4 is a top view of the first side of the seat.

Referring now to FIGS. 3 and 4, second end 19b of suspending cord 6 is passed through slit 20 of sewn-on pre-slit second side leather grommet 8b and pulled easily through second side seat pocket 11b with a suitable implement such as a wire with a hook on the end (not shown). Once second end 19b of suspending cord 6 has been pulled through pocket 11b from slit 20, it is affixed to second side support rod 7b at the midpoint along its length by using second side cord knot 9b tied around the circumference of second side support rod 7b thereby causing second side cord end 19b to be unattached and loose. It should be pointed out that first side support rod 7a and second side support rod 7b could be made from a great variety of material and cross-sections. Among the materials tried by the inventors were wood, fiberglass, synthetic plastic, and steel. ¼" diameter steel rod was chosen for this embodiment because it is readily available, can support the weight of a large full-grown adult with an acceptable margin of safety, is quite lightweight, can easily and cheaply have a slight, permanent first v-shaped bend 21a placed in the midpoint along the length of first side support rod 7a and a second v-shaped bend 21b placed in the midpoint along the length of second side support 7b with the appropriate machinery, and, very significantly, is small enough in diameter so as not to be felt by the user when sitting in the invention even after an extended period of time.

Unattached second cord end 19b is now stretched and attached along the length of second side support rod 7b on the circumference directly opposite the vertex of second v-shaped bend 21b in second side support rod 7b. The inventors have found that this is a better solution for unattached second cord end 19b than having it simply dangle unattractively from the invention or using a hog ring or some other method to reattach second cord end 19b back onto suspending cord 6. In attaching unattached second cord end 19b to second side support rod 7b, securing material 10, such as a waterproof, reinforced adhesive tape, such as high-quality duct tape, is wrapped around both second cord end 19b and second side support rod 7b as shown in FIG. 4, although other securing materials may be used so long as they are very thin. As indicated earlier, other materials could be used for first side support rod 7a and second side support rod 7b and other methods may be used for affixing and locating suspending cord 6 to the midpoint along the length of first side support rod 7a and second side support rod 7b other than first side cord knot 9a and second side cord knot 9b and first side v-shaped bend 21a and second side v-shaped bend 21b and for securing unattached first side cord end 19a and unattached second side cord end 19b to first side support rod 7a and second side support rod 7b other than securing material 10. The reasons for the placement of unattached second cord end 19b on the circumference directly opposite the vertex of second v-shaped bend 21b in second side support rod 7b and for the thinness of the securing material 10 in this embodiment will become immediately apparent during the use of the invention.

The entire second side assembly 22, made up of second side support rod 7b, around which suspending cord 6 has been tied using second side cord knot 9b on second side v-shaped bend 21b and where second end 19b of suspending cord 6 has been secured to second side support rod 7b with securing material 10, is now placed into second side pocket 11b of seat 12 while pulling on the portion of suspending cord 6 which is immediately on the outside of second side leather grommet 8b. With little effort, second side assembly 22 will be positioned and secured as shown in FIG. 4, in which second side assembly 22 will be centered within second side pocket 11b of seat 12, and in which second side cord knot 9b is completely outside and contiguous with slit 20 in second side leather grommet 8b with second side v-shaped bend 21b protruding slightly from slit 20. The entire process described above is now repeated using the first end 19a of suspending cord 6 and the corresponding components for the first side of seat 12. Construction for this embodiment of the invention is now complete and will appear as in FIG. 2, ready for use out in the field,

OPERATION-FIG. 1

Referring now to FIG, 1, which is a perspective view of the invention hanging from a tree before the user has sat down in it, many of the design features in the foregoing description will now become apparent. Before going into the woods or otherwise out for as walk, the user will wrap seat 12 around the remaining components and place in pocket or other convenient place. Upon arriving at a suitable upright object and desiring to sit down, the user simply unwraps the invention, holds suspending cord 6 in one hand and spring-braced clip 3 in an opened position in the other hand, reaches both hands around the upright object, places suspending cord 6 into opened spring-braced clip 3 and releases spring-braced clip 3 to its closed position. The seat will now be level and the invention will support itself on the object with no adjustment needed. This occurs because suspending cord 6 slides readily and with virtually no friction through D-ring 2 which is attached to the first end of girth webbing 1 and through spring-braced clip 3 which is attached to the second end of girth webbing 1. Thus, any downward pressure whatsoever has the effect of leveling seat 12 and tightening girth webbing 1 around the upright object. The user can now immediately sit down in the invention with no adjustments needed. The force of the user's weight is transmitted to both first side support rod 7a and second side support rod 7b through seat 12 evenly, thus, the need to have first cord end 19a attached opposite from the line of contact between first side support rod 7a and the inside of first side pocket 11a of seat 12 and second cord end 19b attached opposite from the line of contact between second side support rod 7b and the inside of second side pocket 11b of seat 12 and the need for securing material 10 to be made from thin material. The downward force on both first side support rod 7a and second side support rod 7b is transmitted to suspending cord 6 which in turn further tightens girth webbing 1 around the upright object in the manner described above. Since suspending cord 6 is attached to first side support rod 7a and to second side support rod 7b in such a way as to form two fulcrum points at the center of gravity, the tilt of the seat is in balance. Hence, if the user desires to tilt seat 12 either towards or away from the upright object, the user merely shifts his weight to position the scat and it will automatically remain there due to its balanced design. When the user has decided to move on, all that he need do is get up from seat 12, open spring-braced clip 3, remove it from suspending cord 6, and for easy portability, roll up invention within seat 12.

SUMMARY, RAMIFICATIONS, AND SCOPE

From the preceding description of the preferred embodiment, it is evident that the objects of this invention are attained. Hunters, hikers, birdwatchers, and others of any age can set up the invention in one quick and simple movement without the need to adjust or readjust for the girth of the upright object, without the need to level the ends of the seat, and without the need to adjust or readjust the tilt of the scat. This represents not only a savings in precious time and exertion but also, just as important, a great reduction in noise and movement during set up. Once set up, it is comfortable enough to sit in for hours. It is also safe with no danger due to chafing or fraying of its components. Further, it is very light and compact so it can be kept in a pocket when not in use.

While the above description contains many specificities, these should not be construed as limitations on the scope of the invention, but rather as an exemplification of one preferred embodiment thereof. Many other variations are possible. For example, another means of attachment such as a D-ring may be substituted for spring-braced clip 3 on the second end of girth webbing 1 and an openable and closeable, smooth means of connection such as a spring-braced clip can be slid over suspending cord 6 and clipped onto this second D-ring.

Accordingly, the scope of the invention should be determined not by the embodiment illustrated, but by the appended claims and their legal equivalents.

I claim:

1. A method for manufacturing a portable, quick set-up, self-adjusting scaffold seat comprising the steps of:

a. procuring flexible material, cutting said flexible material into a rectangular piece to make a seat, attaching a first pre-slit grommet on a first side of said seat and a second pre-slit grommet to a second side of said seat, folding said first side of said seat over upon itself and attaching it back to said seat thereby forming a first side seat pocket such that center of said first pre-slit grommet lies in the center of said first side seat pocket, folding said second side of said seat over upon itself and attaching it back to said seat thereby forming a second side seat pocket such that center of said second pre-slit grommet lies in the center of said second side seat pocket, slitting the material of said first side seat pocket directly under the slit of said first pre-slit grommet, slitting the material of said second side seat pocket directly under the slit of said second pre-slit grommet;

b. procuring webbing material, cutting said webbing material to a specified length to make a girth webbing, attaching a closed and smooth ring to a first end of said girth webbing, and attaching an openable and closeable smooth ring to a second end of said girth webbing;

c. procuring round such as steel, cutting said stock to the same length as length of said first side seat pocket and placing a v-shaped bend at the midpoint along the length of said cut stock to make a first side support rod, cutting said stock to the same length as length of said second seat pocket and placing a v-shaped bend at the midpoint along the length of said cut stock to make a second side support rod;

d. procuring cord, cutting said cord to a specified length to make a suspending cord;

e. passing a first end of said suspending cord through said first side pre-slit grommet and through one side of said first side seat pocket, f. tying said first end of said suspending cord around the circumference of said first side support rod at said v-shaped bend by means of a knot thereby forming unattached first cord end;

g. stretching and securing said unattached first cord end along the length of said first side support rod on the circumference directly opposite the vertex of said v-shaped bend by means of a thin securing material such as high quality duct tape to make first side assembly;

h. simultaneously pulling said suspending cord out from said first side pre-slit grommet and pushing said first side assembly into said first side seat pocket until said knot protrudes from said first side pre-slit grommet thereby semi-permanently holding said assembly in place;

i. passing a second end of said suspending cord through said closed and smooth ring attached to said first end of said girth webbing;

j. passing said second end of said suspending cord through said second side pre-slit grommet and through one side of said second side seat pocket, k. tying said second end of said suspending cord around the circumference of said second side support rod at said v-shaped bend by means of a knot thereby forming unattached second cord end;

l. stretching and securing said unattached second cord end along the length of said second side support rod on the circumference directly opposite the vertex of said v-shaped bend by means of a thin securing material such as high quality duct tape to make second side assembly;

m. simultaneously pulling said suspending cord out from said second side pre-slit grommet and pushing said second side assembly into said second side seat pocket until said knot protrudes from said second side pre-slit grommet thereby semi-permanently holding said assembly in place.

* * * * *